United States Patent [19]

Scaduto

[11] 3,978,765
[45] Sept. 7, 1976

[54] INTERNAL AND EXTERNAL CUTTING TOOL

[76] Inventor: John R. Scaduto, 14460 E. State Fair, Detroit, Mich. 48205

[22] Filed: July 7, 1975

[21] Appl. No.: 593,687

[52] U.S. Cl. ................................ 90/24 R; 82/1.3; 279/6; 279/20
[51] Int. Cl.² .................................. B23D 13/00
[58] Field of Search ................ 90/24 R; 279/6, 20; 408/703, 204; 82/1.3

[56] References Cited
UNITED STATES PATENTS

| | | | |
|---|---|---|---|
| 1,876,775 | 9/1932 | Smith | 408/204 |
| 2,833,544 | 5/1958 | Blades | 279/6 |
| 3,858,482 | 1/1975 | Scaduto | 279/6 X |

Primary Examiner—Othell M. Simpson
Assistant Examiner—Z. R. Bilinsky
Attorney, Agent, or Firm—Harness, Dickey & Pierce

[57] ABSTRACT

The cutting tool may be employed to shape an internal hole, provide a form to the outer periphery of a workpiece, or shape a hole to a predetermined form while cutting an exterior profile to a desired shape. The tool has a shank with an oval shape flange with a tool-supporting portion having a similar oval shape flange with mating apertures in the flanges. The apertures in the first flange contain a thread while the holes in the second flange are somewhat enlarged. Three set screws are provided in the second flange at each end thereof in engagement with the screws which retain the flanges together. The set screws shift the second flange in any direction relative to the first flange which slopes relative to the axis of the shank so that the tool is offset at an angle to the axis of the shank.

3 Claims, 6 Drawing Figures

U.S. Patent   Sept. 7, 1976   3,978,765
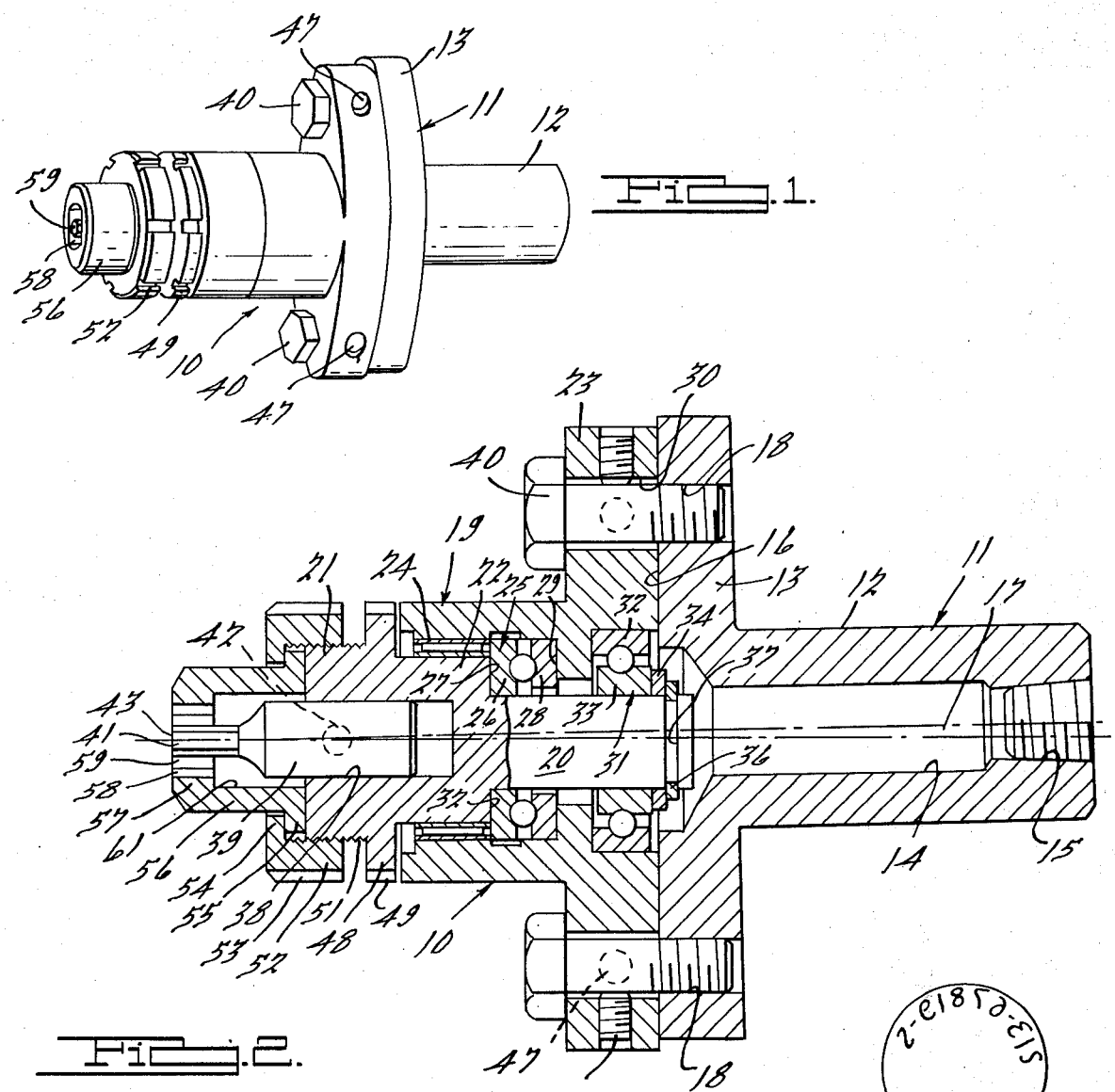
Fig. 1.
Fig. 2.
Fig. 6.
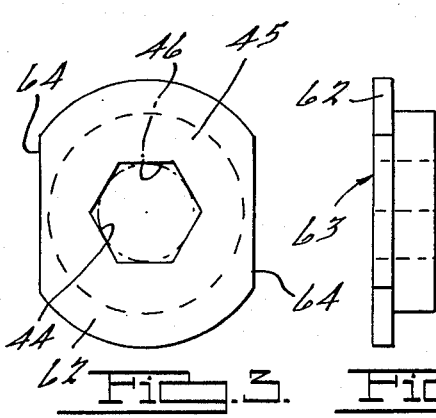
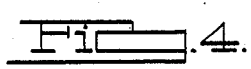
Fig. 3.   Fig. 4.
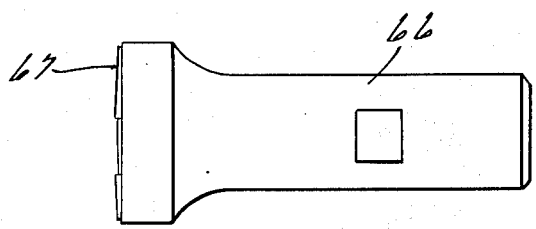
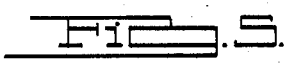
Fig. 5.

INTERNAL AND EXTERNAL CUTTING TOOL

BACKGROUND OF THE INVENTION

Reference may be had to applicant's U.S. Pat. No. 3,858,482 and to U.S. Pat. No. 1,148,065, No. 2,276,945 and No. 2,972,288 for disclosure of the closest known prior art.

SUMMARY OF THE INVENTION

The invention pertains to a tool which is capable of machining on the inside and outside surfaces of a workpiece separately and simultaneously. A shank is provided having a flange of oval shape, the face of the flange sloping relative to the axis of the shank. A tool-supporting body has a similar flange with aligned apertures provided at both ends of the flanges. The holes at the ends of the flange of the shank have a thread therein while the holes in the flange of the tool body are enlarged so that when screws are threaded into the holes of the shank flange, the other flange may be shifted relative thereto. Three set screws are provided at the ends of the flange of the tool body which engage the bodies of the screws and permit the shifting of the tool body in all directions when the set screws are adjusted. The tightening of the screws in the flanges of the shank maintains the two flanges in adjusted fixed relation to each other.

A pair of radial and axial bearings are provided in the body for engaging the stem of a tool holder which is mounted in position by a split washer. An aperture is provided in the forward end of the tool holder opposite to a needle bearing for receiving the shank of the tool which is retained in fixed position in the aperture by a set screw. The end of the tool is pivotably disposed at the point of crossing of the axis of the body and the shank. The tool may be operated in this position for cutting a form on the inside of an aperture as the tool is advanced thereinto and is rotated through its engagement with the wall of the workpiece which is driven in rotation.

In place of the tool for cutting the inside surface of an aperture, a thread may be provided exteriorly of the tool holder on which an inwardly flanged collar is threaded to function as a collet for holding a cutting head which has cutting nibs extending inwardly thereof for cutting flats on a workpiece, cutting external splines, and the like, on the exterior surface thereof. The cutting nibs are also located on the point of crossing of the center line of the shank and that of the tool supporting body. The exterior cutting tool may be employed alone but may also be employed in combination with the interior cutting tool so that exterior and interior forms may be cut simultaneously on the exterior and interior surfaces. The inner and outer surface cutting tools may be angularly adjusted relative to each other to have one profiled surface angularly positioned relative to the other. A rotary lettering and numbering stamp may also be employed in the holder for numbering the part which is manufactured.

BRIEF DESCRIPTION OF THE DRAWINGS

FIG. 1 is a perspective view of the profiling tool embodying features of the present invention;

FIG. 2 is a sectional view of the tool illustrated in FIG. 1, taken through the center thereof;

FIG. 3 is a flanged cylindrical workpiece which has the internal and external surfaces profiled by the tool of FIGS. 1 and 2;

FIG. 4 is an edge view of the structure illustrated in FIG. 3;

FIG. 5 is an enlarged view of a numbering and lettering stamp which may be applied to a finished workpiece by the tool of the present invention; and FIG. 6 is an end view of the stamp illustrated in FIG. 5 showing the extending numbers and lettering provided thereon.

DESCRIPTION OF THE PREFERRED EMBODIMENT

The tool holder 10 of the present invention embodies an adaptor 11 having a cylindrical shank 12 and an oval shape flange 13. An aperture 14 extends into the shank 12 and terminates at the outer end of a pipe thread 15 by which a conduit may be secured for delivering a fluid such as oil or a coolant to the cutter at the opposite end of the tool holder. The front face 16 of the flange 13 is disposed at an angle of one or more degrees to the axis 17 of the shank 12. Two tapped holes 18 at the ends of the flange 13 likewise have their axes disposed to be at an angle to the axis of the shank so as to be normal to the face of the flange 13. A holder 19 for a rotary tool supporting spindle 21 has a cylindrical body 22, a stub shaft 20 and an oval shape flange 23. A needle bearing 24 is mounted between the spindle 21 and the inner wall of the cylindrical body 22. A thrust bearing 25 has a race 26 engaging a shoulder 27 on the spindle 21 and a second race 28 engaging a shoulder 29 of the holder 19. A ball bearing 31 has a nose 32 engaging an inner wall of the holder 19 and an inner race 33 engaging the stub shaft 20. A washer 34 is retained in position on the stub shaft 20 by a snap ring 36 disposed within an annular slot 37 near the end thereof.

A pair of screws 40 extend through apertures 30 in the flange 23 and are screwed into the threaded apertures 18 for clamping the flanges 13 and 23 in fixed engaged relation after the flanges are relatively adjusted. For adjusting the flanges, three set screws 47 are provided at the ends of the flange 23 in engagement with the screws 40 before the two flanges 13 and 23 are in secured relation to each other. The three set screws at each end of the flange 23 permit the flange to be adjusted in any direction so as to position a tool or tools relative to the crossed axes of the shank and the tool supporting body. After adjustment the screws 40 are tightened to retain the tool supporting body in fixed relation to the shank. All of the parts are retained in unit relation permitting the spindle 21 to freely rotate when forced with considerable pressure toward the workpiece without damage to any of the parts in view of the presence of the thrust bearing 25.

The spindle 21 has an aperture 38 for the shank 39 of the tool 41, the shank being retained in position by a set screw 42. In the present arrangement the tool end 43 is of hexagonal shape for producing a hexagonal aperture 44 in a workpiece 45 as illustrated in FIG. 3. In view of having the face 16 of the flange 13 offset one or more degrees from the axis 17 of the shank 12, the axis of the tool is disposed at an angle of one or more degrees from the axis of the shank. The workpiece 45 rotates and the cylindrical aperture 46 in the workpiece will have the axis aligned with the tool axis so that when the end of the tool is advanced, the corners will engage the wall of the aperture 46 and will cut corners therein by a nibbling action.

The tool supporting spindle 21 has a flange 48 containing spanner wrench slots 49 and an exterior threaded section 51. An internally threaded clamping element 52 has similar spanner wrench slots 53 and an inwardly extending flange 54. The flange engages a flange 55 on the inner end of a cylindrical body 56 which supports apertured head 57. The head may be provided with a plurality of slots 58 leaving cutting elements 59 therebetween which are evenly spaced about the inner wall of the aperture for cutting splines on the outer surface of a rotating workpiece. The cylindrical body 56 has a hollow interior 61 in which the end 41 of the tool 39 may be supported. When both are disposed in cutting relation to the workpiece as illustrated in FIG. 1, both the internal and external surfaces will be machined. If in place of the splines 59 opposite straight, cordal, cutting edges are provided, an exterior flange 62 on a workpiece 63 will have opposite sides 64 removed as illustrated in FIG. 3. At the same time, the cylindrical opening 46 will have a hexagon 44 cut therein with both tools simultaneously functioning to cut a predetermined form on the internal and external surfaces of a workpiece. The cutting tool 41 or the cutting body 56 may be omitted so that only one surface, either external or internal, may be cut by one of the tools. In this manner the device is versatile as it may cut an internal form, an external form, or both an internal and external form simultaneously on a workpiece.

The tubular body 56 may be omitted and the cutting teeth applied directly to the inner edge of the flange 54 to operate on a larger diameter workpiece. The inner surface of the flange 54 and a washer-like tool, similar to the head 57, may have threaded engagement to provide the external cutter. It is to be understood that both the interior profiling tool and the exterior profiling tool may be disposed in different angular relation to each other when the interior profiled surface is to be located realtive to the exterior profiled surface. One or both of the tools may be angularly adjusted to attain such positioning.

Further advantage is provided with this type of tool holder by providing a lettering and numbering stamp 66, as illustrated in FIGS. 5 and 6, which is substituted for both of the internal and external cutting elements 41 and 56. The stamp 66 is secured within the aperture 38 by the set screws 42. The letters and numbers 67 extend outwardly from the face of the stamp and are forced into the surface of the workpiece when driven in rotation, thereby to cause the stamp to rotate therewith and apply the lettering thereto.

I claim:

1. In a cutting device for forming the internal and external surface of a workpiece, an adaptor having a supporting shank and a flange at one end having a face which slopes relative to the axis of the shank, a tool holder having a flange engaging said adaptor flange, a rotatable spindle supported within the holder and having a central aperture for receiving a tool, a tool for said aperture, a clamping element about said tool holder and threaded thereon for adjustably supporting a second tool which machines the outer surface of a workpiece, whereby the cutting device is advanced toward a workpiece and is driven in rotation thereby on an axis of the spindle for cutting both an internal and external surface simultaneously.

2. In a cutting device as recited in claim 1 wherein a screw is provided at each end of the flanges for securing them together with the axis of the tool holder at an angle to the axis of the adaptor, and means for adjusting the flanges relative to each other for changing the cutting relation between said tool holder and adapter axis.

3. In a cutting device as recited in claim 2 wherein said means for adjusting the flanges relative to each other comprises a plurality of set screws in the flange of the tool holder disposed in engagement with each said screw by which one flange is shifted relative to the other.

* * * * *